US012675964B2

(12) United States Patent　　　　(10) Patent No.:　US 12,675,964 B2
Marzorati et al.　　　　　　　　　　 (45) Date of Patent:　　Jul. 7, 2026

(54) SELECTIVE CONTOUR READING FROM IMAGE BASED ON CONTEXTUAL IMAGE ANALYSIS WITH AUGMENTED REALITY FEEDBACK

(71) Applicant: INTERNATIONAL BUSINESS MACHINES CORPORATION, Armonk, NY (US)

(72) Inventors: Mauro Marzorati, Lutz, FL (US); Jeremy R. Fox, Georgetown, TX (US); Sarbajit K. Rakshit, Kolkata (IN); Carolina Garcia Delgado, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 17/933,130

(22) Filed: Sep. 19, 2022

(65) Prior Publication Data

US 2024/0096046 A1　　　Mar. 21, 2024

(51) Int. Cl.
　*G06V 10/22*　　　(2022.01)
　*G06T 11/23*　　　(2026.01)
　　　　　(Continued)
(52) U.S. Cl.
　CPC ............ *G06V 10/225* (2022.01); *G06T 11/23* (2026.01); *G06V 10/82* (2022.01); *G06V 20/20* (2022.01); *G06T 2210/12* (2013.01)
(58) Field of Classification Search
　CPC ...... G06V 10/225; G06V 10/82; G06V 20/20; G06V 10/22; G06T 11/203; G06T 2210/12
　See application file for complete search history.

(56) References Cited

U.S. PATENT DOCUMENTS 8,175,925　B1　　5/2012　Rouaix
10,169,677　B1　　1/2019　Ren
　　　　　　　(Continued)

FOREIGN PATENT DOCUMENTS

CN　　　108388845　A　　8/2018
CN　　　113592894　A　　11/2021
JP　　　2021192267　A　　12/2021

OTHER PUBLICATIONS

Disclosed Anonymously, "Superimposed Inventory and Supply Management for Physical Retail Interactions," IP.com, IP.com No. IPCOM000265589D, IP.com Publication Date: Apr. 27, 2021, 6 pages.

(Continued)

*Primary Examiner* — Grace Q Li
(74) *Attorney, Agent, or Firm* — Anthony M. Pallone

(57)　　　　　　ABSTRACT

According to one embodiment, a method, computer system, and computer program product for selective image processing. The embodiment may include receiving a digital image for selective image processing. The embodiment may include identifying a context of the selective image processing. The embodiment may include performing object detection within the received digital image to identify one or more depicted objects based on the identified context. The embodiment may include overlaying, on at least one portion of the received digital image, one or more bounding boxes which encompass relative positions of the identified one or more depicted objects. The embodiment may include performing the selective image processing exclusively within the one or more overlaid bounding boxes.

17 Claims, 2 Drawing Sheets

⌐200

START

202 — RECEIVE IMAGE FOR IMAGE PROCESSING

204 — IDENTIFY CONTEXT OF IMAGE PROCESSING

206 — PERFORM OBJECT DETECTION WITHIN IMAGE BASED ON IDENTIFIED CONTEXT

208 — OVERLAY, ON IMAGE, BOUNDING BOX AROUND DETECTED OBJECT(S)

210 — PERFORM IMAGE PROCESSING WITHIN OVERLAID BOUNDING BOX

END

(51) Int. Cl.
  *G06V 10/82*    (2022.01)
  *G06V 20/20*    (2022.01)

(56)      References Cited

U.S. PATENT DOCUMENTS

| | | | |
|---|---|---|---|
| 2015/0117788 A1 | 4/2015 | Patel | |
| 2020/0334907 A1 | 10/2020 | Bender | |
| 2021/0365961 A1 | 11/2021 | Marshall | |
| 2022/0207281 A1* | 6/2022 | Troisi | G06N 3/08 |
| 2023/0334629 A1* | 10/2023 | Chen | G06T 7/55 |
| 2024/0331354 A1* | 10/2024 | Azad | G16H 20/40 |

OTHER PUBLICATIONS

IBM, "IBM Maximo Application Suite: Visual Inspection Mobile," IBM.com, Accessed: Jun. 29, 2022, https://www.ibm.com/products/maximo-visual-inspection-mobile?=schedulerform, 6 pages.
Rasouli et al., "Visual Saliency Improves Autonomous Visual Search," 2014 Canadian Conference on Computer and Robot Vision, 2014 IEEE, Downloaded: Jun. 16, 2022, pp. 111-118.

* cited by examiner

100 ⌐

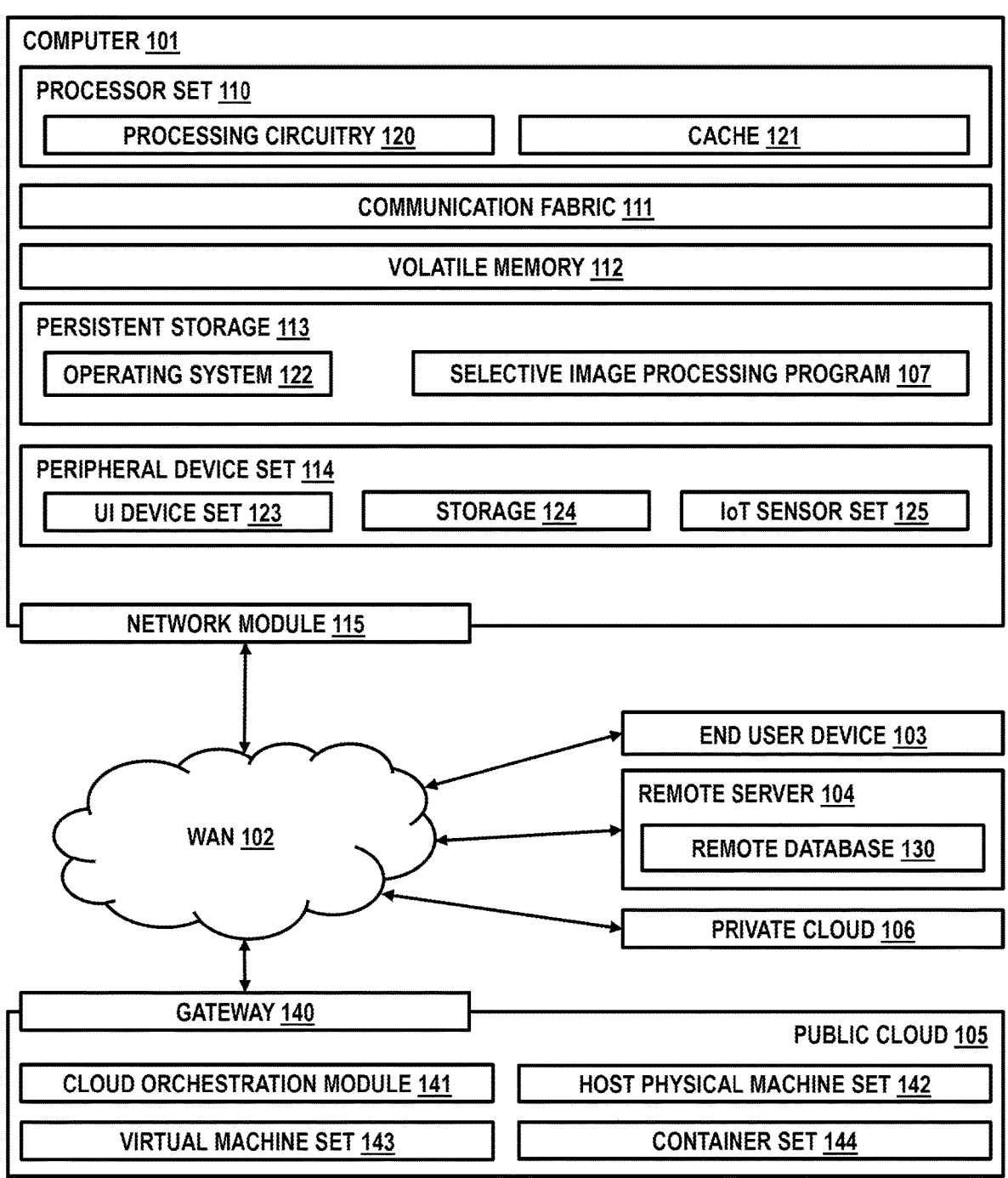

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122    SELECTIVE IMAGE PROCESSING PROGRAM 107

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

*Figure 1*

SELECTIVE CONTOUR READING FROM IMAGE BASED ON CONTEXTUAL IMAGE ANALYSIS WITH AUGMENTED REALITY FEEDBACK

BACKGROUND

The present invention relates generally to the field of computing, and more particularly to digital image analysis.

Image analysis, or image processing, is the extraction of meaningful information from images; primarily digital images through digital image processing techniques. Essentially, image processing utilizes quantitative data or numerical data sets to change a visual result. Types of image processing may be separated into digital image processing, where a computing device (e.g., computer, smartphone, tablet) and one or more programs (i.e., software) analyze a digital array of image pixels, and analog image processing, where the software analyzes a physical image. In addition to information extraction (e.g., reading label information or bar-coded tags), image processing may be performed for other purposes including image recognition, image enhancement, and object detection within an image. Object detection is a computer technology related to image processing that is used to detect instances of visual objects of certain classes (e.g., humans, cars, buildings, boxes) within digital images such as photos or video frames. As a key field in artificial intelligence and deep learning, object detection allows computer systems to see their environments by detecting objects, identifying them within rectangles called bounding boxes, and labeling them with a classification (i.e., inferring a class to which the object belongs).

SUMMARY

According to one embodiment, a method, computer system, and computer program product for selective image processing. The embodiment may include receiving a digital image for selective image processing. The embodiment may include identifying a context of the selective image processing. The embodiment may include performing object detection within the received digital image to identify one or more depicted objects based on the identified context. The embodiment may include overlaying, on at least one portion of the received digital image, one or more bounding boxes which encompass relative positions of the identified one or more depicted objects. The embodiment may include performing the selective image processing exclusively within the one or more overlaid bounding boxes.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computer environment according to at least one embodiment.

DETAILED DESCRIPTION

Figure 2:
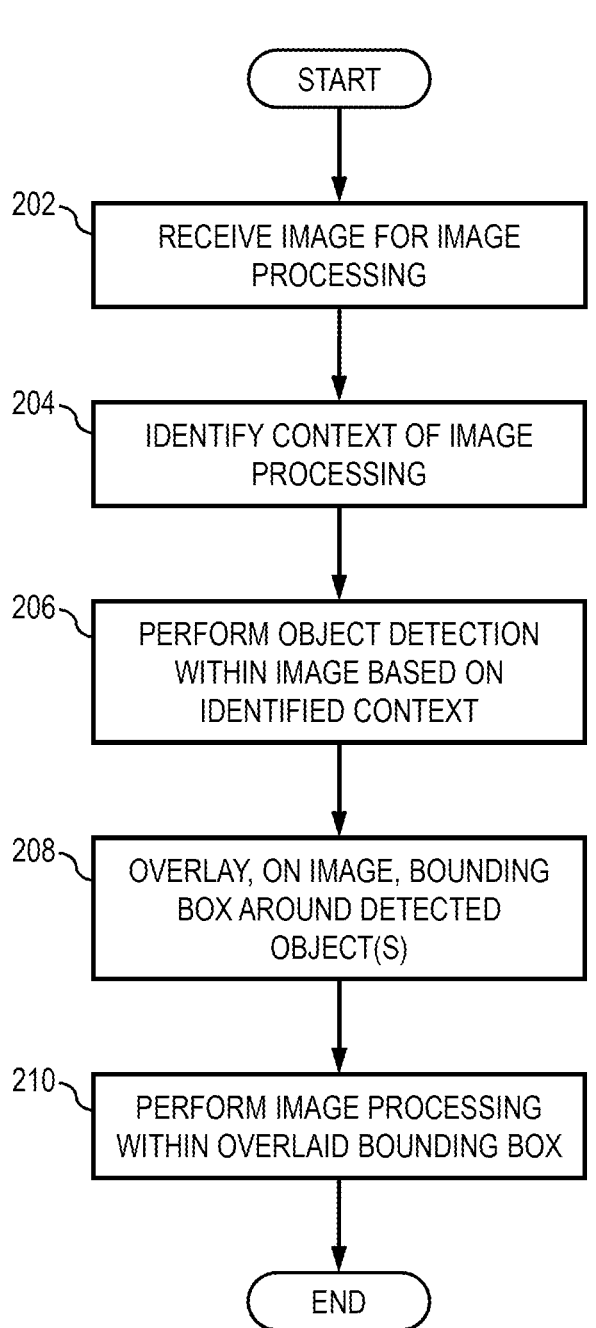
FIG. 2 illustrates an operational flowchart for performing image analysis on one or more selective portions of a digital image via a selective image processing process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to digital image analysis. The following described exemplary embodiments provide a system, method, and program product to, among other things, perform image analysis on one or more selective areas of an image for a given contextual purpose. Therefore, the present embodiment has the capacity to improve the technical field of digital image analysis by dynamically identifying one or more areas of an image on which further image analysis for a specified contextual purpose may be performed while excluding, from further image analysis, those areas of the image which were not identified, thus increasing efficiency of the performed image analysis for the given contextual purpose.

As previously described, image analysis, or image processing, is the extraction of meaningful information from images; primarily digital images through digital image processing techniques. Essentially, image processing utilizes quantitative data or numerical data sets to change a visual result. Types of image processing may be separated into digital image processing, where a computing device (e.g., computer, smartphone, tablet) and one or more programs (i.e., software) analyze a digital array of image pixels, and analog image processing, where the software analyzes a physical image. In addition to information extraction (e.g., reading label information or bar-coded tags), image processing may be performed for other purposes including image recognition, image enhancement, and object detection within an image. Object detection is a computer technology related to image processing that is used to detect instances of visual objects of certain classes (e.g., humans, cars, buildings, boxes) within digital images such as photos or video frames. As a key field in artificial intelligence and deep learning, object detection allows computer systems to see their environments by detecting objects, identifying them within rectangles called bounding boxes, and labeling them with a classification (i.e., inferring a class to which the object belongs).

As noted above, image processing may be performed for different contextual purposes. For example, in the context of product inventory tracking/control, image processing may be implemented to analyze product stock count within a storage area (e.g., a shelving unit) depicted within an image. As another example, in the context of in-process product manufacturing, image processing may be implemented to analyze production line speed and/or identify any bottlenecks within a production line area depicted within an image. Typically, in either example, the entirety of an image is submitted for image processing (e.g., information extraction) for the given contextual purpose despite there only being one or more portions of the image which may be relevant to the contextual purpose, and thus sufficient for the required image processing. Consequently, when the entirety of the image is subjected to image processing for the given contextual purpose, additional computing resources (e.g., processing capability, memory) may be required to process unnecessary data from one or more portions of the image which are not relevant to the contextual purpose. It may therefore be imperative to have a system in place to dynamically identify one or more portions of an image which are required for additional image processing for a specified contextual purpose. Thus, embodiments of the present invention may be advantageous to, among other things, identify one or more objects, or groups of objects, within a digital image which are relevant to a specified contextual purpose of further image processing, overlay, within a digital image, one or more bounding boxes which surround areas of the digital image containing identified relevant objects, or groups of objects, perform further image processing (e.g., extract information) for a given contextual purpose within one or more overlaid bounding boxes within a digital image, and exclude, from further image processing, one or more portions of a digital image not within an overlaid bounding box. The present invention does not require that all advantages need to be incorporated into every embodiment of the invention.

According to at least one embodiment, preliminary image processing of a digital image, received from at least one stationary image capture device, may be performed to identify/detect one or more objects, or groups of objects, which are relevant to a specified contextual purpose for further image processing. A degree of influence may be calculated for each detected object or group of objects within the digital image. Augmented reality feedback, in the form of one or more bounding boxes, may be automatically overlaid on the digital image to surround/border one or more portions of the image (e.g., pixel ranges) which contain the detected one or more objects or groups of objects. According to at least one embodiment, further image processing for the specified contextual purpose (e.g., object information extraction, object count) may be performed on the one or more portions of the digital image within a bounding box while area(s) of the digital image not within a bounding box are excluded from further image processing.

According to at least one other embodiment, the digital image may be received from one or more mobile image capture devices (e.g., smartphones, smart glasses, wearable cameras). Furthermore, the received digital image may be part of a group of captured digital images or a stream of digital images. According to yet another embodiment, more than one contextual purpose for further image processing may be specified and, accordingly, further image processing of one or more bounded portions of a digital image may be performed for different contextual purposes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to perform image processing for a specified contextual purpose on one or more selected portions of a digital image and, accordingly, exclude from image processing for the specified contextual purpose any portions of the digital image not selected.

Referring to FIG. 1, an exemplary computing environment 100 is depicted, according to at least one embodiment. Computing environment 100 contains an example of an environment for the execution of at least some of the computer code involved in performing the inventive methods, such as selective image processing program 107. In addition to selective image processing program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and selective image processing program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in selective image processing program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in selective image processing program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a GPS receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The selective image processing program 107 may be a program capable of performing image processing for a specified contextual purpose on one or more portions of a digital image depicting objects identified as being relevant to the specified contextual purpose. For example, for a specified context of product inventory tracking, selective image processing program 107 may identify objects within a digital image as being inventory items (e.g., boxes), overlay, on the digital image, a bounding box which defines a perimeter around a portion of the digital image depicting the identified inventory items, and perform image processing exclusively within the bounding box to extract information from the identified inventory items (e.g., determine an inventory count, read label/stock-keeping unit (SKU) information). In at least one embodiment, selective image processing program 107 may require a user to opt-in to system usage upon opening or installation of selective image processing program 107. Notwithstanding depiction in computer 101, selective image processing program 107 may be stored in and/or executed by, individually or in any combination, end user device 103, remote server 104, public cloud 105, and private cloud 106 so that functionality may be separated among the devices. The selective image processing method is explained in further detail below with respect to FIG. 2.

Referring now to FIG. 2, an operational flowchart for performing image analysis on one or more selective portions of a digital image via a selective image processing process 200 is depicted according to at least one embodiment. At 202, selective image processing (SIP) program 107 receives, from one or more stationary cameras positioned within a structure, a digital image for selective image processing. For example, SIP program 107 may receive a whole-room field-of-view captured digital image depicting an inventory storage area (e.g., the inside of a warehouse) and/or an inventory production line (e.g., an industrial production area). According to at least one other embodiment, SIP program 107 may receive the digital image from one or more mobile image capture devices (e.g., smartphones, smart glasses, wearable cameras) within the structure. For example, SIP program 107 may receive a captured digital image depicting an inventory item and/or a portion of a production line. According to another embodiment, SIP program 107 may receive multiple digital images (e.g., a stream of digital images) from one or more stationary cameras and/or mobile image capture devices within a structure.

Next, at 204, SIP program 107 identifies a context of the selective image processing to be performed on the received image. The context of the selective image processing may be a specified purpose or goal (e.g., outcome) for performance of the selective image processing. For example, the context of the selective image processing to be performed on the received whole-room field-of-view captured digital image depicting an inventory storage area may be to extract information from one or more inventory item labels or to identify a count of depicted inventory items. According to at least one embodiment, the context of selective image processing may be specified by a user during an initialization/set-up phase of SIP program 107. According to at least one other embodiment, based on analysis of previously performed image processing of different types of received images (e.g., images depicting different categorized environments), SIP program 107 may create a historical knowledge corpus of different types of images with correlated contexts of selective image processing. The historical knowledge corpus may be stored within storage 124 and/or remote database 130. Moreover, SIP program 107 may refer to the historical knowledge corpus upon receipt of a digital image in order to identify a context of the selective image processing to be performed on the received image.

According to yet another embodiment, SIP program 107 may control capture of one or more digital images based on an identified context of selective image processing. For example, where an image is to be captured for a specific purpose of analysis (i.e., context of selective image processing), SIP program 107 may control a lens of one or more stationary cameras and/or mobile image capture devices so that images depicting only required areas or a room may be captured while other areas of the room are ignored. Furthermore, SIP program 107 may specify a required quality (e.g., pixel resolution) with which to capture an image.

At 206, SIP program 107 performs object detection within the received digital image based on the identified context of the selective image processing to be performed on the received image. More specifically, SIP program 107 may identify one or more objects, or groups of objects, within the received digital image which are relevant to the identified context. For example, given a context of identifying a count of depicted inventory items, SIP program 107 may utilize known object detection algorithms (e.g., Faster Region-Based Convolutional Neural Network (Faster R-CNN), Single Shot Detector (SSD), You Only Look Once (YOLO)) trained within the given context to categorize objects detected within the received digital image as inventory items and identify their relative positions within the image. SIP program 107 may further analyze the identified relative positions of depicted objects (e.g., inventory items) as they relate to the identified context of the selective image processing to be performed.

According to at least one further embodiment, information relating to detected objects (e.g., object type, object dimensions) for a given context of selective image processing may be stored, by SIP program 107, within the historical knowledge corpus and may serve as templates/definitions of required objects when performing future object detection within the given context of selective image processing. Moreover, as different types of objects may be correlated with different contexts of selective image processing, SIP program 107 may refer to templates/definitions of required objects within the historical knowledge corpus when performing object detection within a received digital image based on an identified context of selective image processing.

According to at least one other embodiment, at 206, SIP program 107 may also calculate an influence degree value for each detected object, or group of objects, on the selective image processing to be performed. An influence degree may relate to an amount of impact, or weight, a detected object, or group of objects, may have on the selective image processing for an identified context. As such, influence degree may measure functionality, from a user's point of view, of an identified object (working from the knowledge corpus of defined objects). SIP program 107 may calculate the influence degree of a detected object using the formula $FP=UFP*CAF$, where FP is the function point for the influence degree, UFP is the unadjusted function point, and CAF is the complexity adjustment factor. A higher influence degree of a first detected object, relative to an influence degree of a second detected object, may indicate that the first detected object possesses a greater contextual influence/importance within the selective image processing than the second detected object. Identified relative positions (e.g., pixel coordinates, ranges) of objects detected with the digital image may be associated with their respectively calculated influence degrees. Furthermore, storage within the historical knowledge corpus of information relating to a detected object for a given context of selective image processing may be contingent upon the influence degree of the detected object being equal to or above a threshold value. Similarly, qualification of a detected object for a given context to serve as a template/definition for a required object when performing future object detection within the given context of selective image processing may also be contingent upon the influence degree of the detected object being equal to or above a threshold value. As such, for different contexts of selective image processing, SIP program 107 may create one or more rules which define required objects. Rules defining required objects for different contexts of selective image processing may also be stored within the historical knowledge corpus and associated with their respective contexts.

Next, at 208, SIP program 107 overlays, within the received digital image, a bounding box which forms a perimeter around the relative positions of the one or more objects detected at 206. For example, within the whole-room field-of-view captured digital image depicting an inventory storage area, SIP program 107 may display a bounding box encompassing the relative positions of detected inventory items. Separate bounding boxes may be utilized for each detected inventory item, or a single bounding box may be utilized to encompass multiple detected inventory items. The received digital image with one or more overlaid bounding boxes may be displayed to the user (e.g., via a screen of a computing device of the user) and provide visual feedback to the user indicating which portion(s) of the digital image are selected for the selective image processing. According to at least one embodiment, the received digital image with overlaid bounding boxes may be display as augmented reality (AR) feedback within a display of AR enabled smart glasses of the user or other AR enabled device of the user. Furthermore, the identified context for selective image processing (e.g., inventory count) may also be displayed to the user as part of the visual or AR feedback.

According to at least one other embodiment, a single received digital image may be concurrently analyzed for more than one context of selective image processing. In such an embodiment, SIP program 107 may detect objects based on their respective contexts and overlay, within the image, bounding boxes which are color-coded or labeled for different contexts of selective image processing. For example, a whole-room field-of-view captured digital image depicting an inventory storage area and a production line area may be concurrently analyzed for selective image processing within the separate contexts of product inventory tracking and in-process product manufacturing. SIP program 107 may detect, within the image, one or more objects relating to inventory tracking (e.g., inventory items) as well as one or more objects relating to in-process product manufacturing (e.g., industrial machines). Accordingly, SIP program 107 may display, within the image, one or more bounding boxes, which are color-coded or labeled for inventory tracking, around detected objects relating to inventory tracking and one or more bounding boxes, which are color-coded or labeled for in-process product manufacturing, around detected objects relating to in-process product manufacturing.

According to at least one further embodiment, overlay of a bounding box, within a received digital image, around a detected object for a given context of selective image processing may be contingent upon an influence degree of the detected object being equal to or above a threshold value. Correspondingly, an influence degree of a detected object may be associated with its respective bounding box. For example, in the context of inventory tracking, SIP program 107 may display a bounding box around a detected inventory item only where the calculated influence degree of the inventory item is equal to or exceeds a threshold value. Furthermore, a priority level (e.g., low, medium, high, or a color-coded scale) of an overlaid bounding box around a detected object may be based on an influence degree of the detected object. Information relating to an associated influence degree and/or a priority level of a bounding box may also be displayed to the user as part of the visual or AR feedback. According to yet another embodiment, SIP program 107 may also receive information (e.g., pixel ranges, priority levels, influence degrees) relating to manually configured bounding boxes for overlay on a received digital image. For example, a user may specify information of a desired bounding box for overlay, by SIP program 107, on a received digital image.

At 210, SIP program 107 performs selective image processing for the identified context within portions of the received digital image encompassed by an overlaid bounding box. It should be noted that the selective image processing may be performed exclusively within overlaid bounding boxes while any remaining portions of the received digital image not encompassed by an overlaid bounding box are ignored. An output of the performed selective image processing may be a decision by an artificial intelligence (AI) system, a recommendation, an evaluation of a process (e.g., a manufacturing process), or the extraction of information. For example, in the context of product inventory tracking, SIP program 107 may perform selective image processing exclusively within those portions of the received digital image (i.e., the whole-room field-of-view captured digital image depicting an inventory storage area) encompassed within an overlaid bounding box. For those portions of the digital image, SIP program 107 may extract information relating to a count of detected inventory items contained therein. Moreover, for a given context of performed selective image processing, output of the performed selective image processing (e.g., a count of inventory items) may also be displayed to the user as part of the visual or AR feedback. Also, for a given context of performed selective image processing, image processing output from separate bounding boxes may be displayed to the user in respective windows or combined within one window. For example, in the context of product inventory tracking, SIP program 107 may display three separate inventory counts, in individual windows, from three respective bounding boxes overlaid on the received image.

According to another embodiment, performance of the selective image processing within a portion of the received digital image encompassed by an overlaid bounding box may be contingent upon an influence degree of a detected object contained therein being equal to or above a threshold value. For example, in the context of product inventory tracking, SIP program 107 may only perform selective image processing within a portion of the received digital image encompassed by an overlaid bounding box provided that the calculated influence degree for a detected inventory item contained therein equals or exceeds a threshold value. Furthermore, according to yet another embodiment, performance of the selective image processing within a portion of the received digital image encompassed by an overlaid bounding box may be contingent upon a priority level of the overlaid bounding box being equal to or above a threshold value.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

receiving a digital image for selective image processing;

identifying a context of the selective image processing;

performing object detection within the received digital image to identify one or more depicted objects based on the identified context;

calculating an influence degree value for each of the one or more identified depicted objects, wherein an influence degree value of an identified depicted object comprises a weight the identified depicted object has on performance of the selective image processing for the identified context;

overlaying, on at least one portion of the received digital image, one or more bounding boxes which encompass relative positions of the one or more identified depicted objects;

identifying a priority level for each of one or more overlaid bounding boxes based on respective influence degree values of their respectively contained one or more identified depicted objects; and performing the selective image processing exclusively within the one or more overlaid bounding boxes in response to respective influence degree values of the one or more identified depicted objects within the one or more overlaid bounding boxes being equal to or above a first threshold value and in response to respective priority levels of the one or more overlaid bounding boxes being equal to or above a second threshold value.

2. The method of claim 1, further comprising:

overlaying, on a portion of the received digital image, a bounding box which encompasses a relative position of an identified depicted object in response to a calculated influence degree value of the identified depicted object being equal to or greater than a threshold value.

3. The method of claim 1, wherein performing the selective image processing exclusively within the one or more overlaid bounding boxes further comprises:

extracting information relating to the identified context of the selective image processing; and ignoring any portion of the received digital image not within the one or more overlaid bounding boxes.

4. The method of claim 1, wherein the digital image is received from one or more stationary cameras and/or mobile image capture devices within a structure.

5. The method of claim 1, further comprising:

displaying, via an augmented reality (AR)-enabled device of a user, the received digital image with one or more overlaid bounding boxes; and displaying, via the AR-enabled device of the user, output of the selective image processing for the identified context performed within the one or more overlaid bounding boxes.

6. The method of claim 1, wherein the performed object detection utilizes an object detection algorithm comprising a convolutional neural network trained based on the identified context of the selective image processing.

7. A computer system, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a digital image for selective image processing;

identifying a context of the selective image processing;

performing object detection within the received digital image to identify one or more depicted objects based on the identified context;

calculating an influence degree value for each of the one or more identified depicted objects, wherein an influence degree value of an identified depicted object comprises a weight the identified depicted object has on performance of the selective image processing for the identified context;

overlaying, on at least one portion of the received digital image, one or more bounding boxes which encompass relative positions of the one or more identified depicted objects;

identifying a priority level for each of one or more overlaid bounding boxes based on respective influence degree values of their respectively contained one or more identified depicted objects; and performing the selective image processing exclusively within the one or more overlaid bounding boxes in response to respective influence degree values of the one or more identified depicted objects within the one or more overlaid bounding boxes being equal to or above a first threshold value and in response to respective priority levels of the one or more overlaid bounding boxes being equal to or above a second threshold value.

8. The computer system of claim 7, further comprising:

overlaying, on a portion of the received digital image, a bounding box which encompasses a relative position of an identified depicted object in response to a calculated influence degree value of the identified depicted object being equal to or greater than a threshold value.

9. The computer system of claim 7, wherein performing the selective image processing exclusively within the one or more overlaid bounding boxes further comprises:

extracting information relating to the identified context of the selective image processing; and ignoring any portion of the received digital image not within the one or more overlaid bounding boxes.

10. The computer system of claim 7, wherein the digital image is received from one or more stationary cameras and/or mobile image capture devices within a structure.

11. The computer system of claim 7, further comprising:

displaying, via an augmented reality (AR)-enabled device of a user, the received digital image with one or more overlaid bounding boxes; and displaying, via the AR-enabled device of the user, output of the selective image processing for the identified context performed within the one or more overlaid bounding boxes.

12. The computer system of claim 7, wherein the performed object detection utilizes an object detection algorithm comprising a convolutional neural network trained based on the identified context of the selective image processing.

13. A computer program product, the computer program product comprising:

one or more computer-readable tangible storage medium and program instructions stored on at least one of the one or more tangible storage medium, the program instructions executable by a processor capable of performing a method, the method comprising:

receiving a digital image for selective image processing;

identifying a context of the selective image processing;

performing object detection within the received digital image to identify one or more depicted objects based on the identified context;

calculating an influence degree value for each of the one or more identified depicted objects, wherein an influence degree value of an identified depicted object comprises a weight the identified depicted object has on performance of the selective image processing for the identified context;

overlaying, on at least one portion of the received digital image, one or more bounding boxes which encompass relative positions of the one or more identified depicted objects;

identifying a priority level for each of one or more overlaid bounding boxes based on respective influence degree values of their respectively contained one or more identified depicted objects; and performing the selective image processing exclusively within the one or more overlaid bounding boxes in response to respective influence degree values of the one or more identified depicted objects within the one or more overlaid bounding boxes being equal to or above a first threshold value and in response to respective priority levels of the one or more overlaid bounding boxes being equal to or above a second threshold value.

14. The computer program product of claim 13, further comprising:

overlaying, on a portion of the received digital image, a bounding box which encompasses a relative position of an identified depicted object in response to a calculated influence degree value of the identified depicted object being equal to or greater than a threshold value.

15. The computer program product of claim 13, wherein performing the selective image processing exclusively within the one or more overlaid bounding boxes further comprises:

extracting information relating to the identified context of the selective image processing; and ignoring any portion of the received digital image not within the one or more overlaid bounding boxes.

16. The computer program product of claim 13, wherein the digital image is received from one or more stationary cameras and/or mobile image capture devices within a structure.

17. The computer program product of claim 13, further comprising:

displaying, via an augmented reality (AR)-enabled device of a user, the received digital image with one or more overlaid bounding boxes; and displaying, via the AR-enabled device of the user, output of the selective image processing for the identified context performed within the one or more overlaid bounding boxes.

* * * * *